United States Patent [19]

Barkus

[11] Patent Number: 5,581,866
[45] Date of Patent: Dec. 10, 1996

[54] DEVICES FOR MOUNTING AN AUTOMOBILE WHEEL ON A HUB ASSEMBLY AND LIFTING AN AUTOMOBILE WHEEL INTO AN AUTOMOBILE BODY

[76] Inventor: Philip Barkus, 407 Cartwright Blvd., Massapequa Park, N.Y. 11762

[21] Appl. No.: 322,071

[22] Filed: Oct. 12, 1994

Related U.S. Application Data

[62] Division of Ser. No. 144,656, Oct. 28, 1993, Pat. No. 5,479,692.

[51] Int. Cl.⁶ .................................................. B23P 19/04
[52] U.S. Cl. ..................... 29/273; 7/100; 157/14
[58] Field of Search ........................... 29/270, 271, 273, 29/468, 894.321; 7/100, 138; D8/31; 254/120, 131; 81/124.5; 157/1, 14

[56] References Cited

U.S. PATENT DOCUMENTS

| | | | |
|---|---|---|---|
| 955,790 | 4/1910 | Givens | 157/14 |
| 1,511,463 | 10/1924 | Griffith, Jr. | 29/273 |
| 1,649,130 | 11/1927 | Schoenwerk | 29/273 |
| 1,735,124 | 11/1929 | Miller | 29/273 |
| 1,969,233 | 8/1934 | Patterson | 29/273 |
| 1,999,206 | 4/1935 | Patterson | 29/273 |
| 2,499,758 | 3/1950 | Kayfetz | 157/1 X |
| 2,555,698 | 6/1951 | Masheck | 29/273 |
| 2,770,873 | 11/1956 | Ramsey | 29/273 |
| 3,048,919 | 8/1962 | Bald | 254/120 X |
| 3,319,327 | 5/1967 | Dombeck | 254/131 X |
| 3,348,294 | 10/1967 | Gerardi | 29/273 |
| 3,364,558 | 1/1968 | Freet | 7/100 X |
| 3,389,453 | 6/1968 | Tarter et al. | 254/131 X |
| 3,555,583 | 1/1971 | Mousel | 7/100 |
| 3,649,976 | 3/1972 | Isom | 7/100 |
| 3,973,283 | 8/1976 | Boe | 7/100 |
| 4,602,415 | 7/1986 | Garcia | 29/273 |
| 4,949,448 | 8/1990 | Hebnes | 29/273 |
| 5,022,133 | 6/1991 | Weitekamp | 29/273 |

FOREIGN PATENT DOCUMENTS

363199 4/1990 European Pat. Off. ............... 29/273

*Primary Examiner*—Peter Vo
*Attorney, Agent, or Firm*—Curtis Morris & Safford, PC; Eugene L. Flanagan, III

[57] ABSTRACT

Devices are provided for use in lifting an automobile wheel into an automobile body. An elongated member releaseably engages an automobile wheel and pivots on the body of the automobile as the elongated member is lifted to lift the automobile wheel into the body. In addition, devices and methods are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

31 Claims, 6 Drawing Sheets

FIG. 1

DEVICES FOR MOUNTING AN AUTOMOBILE WHEEL ON A HUB ASSEMBLY AND LIFTING AN AUTOMOBILE WHEEL INTO AN AUTOMOBILE BODY

This applicatioon is a division of application Ser. No. 08/144,656, filed Oct. 28, 1993, now U.S. Pat. No. 5,479,692.

BACKGROUND OF THE INVENTION

The present invention relates to devices and methods for use in lifting an automobile wheel into an automobile body, as well as to devices and methods for mounting an automobile wheel on an automobile wheel hub assembly and removing the same therefrom.

The problem of replacing a flat tire while on the road is, at best, inconvenient. For many motorists it can also be dangerous. Many are elderly or suffer from a back or other orthopedic problem, or a condition such as a hernia. Moreover, many are untrained in proper techniques for lifting heavy objects or lack the strength to do so.

A number of devices have been proposed for use in assisting motorists in mounting an automobile wheel on a hub. Most such devices affix to a stud of the wheel hub with the intent that the corresponding stud hole in the rim of the wheel will be able to slide over the device and onto the stud. However, mounting an automobile wheel in this fashion is awkward since it is often necessary to rotate, and lift, the wheel in order to mount it on the remaining studs. Moreover, there is typically very little clearance between the stud aperture in the wheel rim and the stud itself so that it may not be possible to provide a workable device for affixing to the stud while permitting the stud aperture to slide thereover onto the stud. The downward force applied to the stud can also cause the hub to rotate, so that it is difficult to mate the apertures in the wheel rim with the studs.

Some devices attempt to rest on the end of the axle but fail to provide a coupling to the axle which is stable.

The foregoing devices, moreover, do not address the problem of lifting a wheel into the trunk or other well within the automobile body after the wheel has been removed from the axle.

OBJECTS AND SUMMARY OF THE INVENTION

It is an object of the present invention to provide methods and devices which alleviate the foregoing problems and disadvantages of existing devices.

It is another object of the present invention to reduce the risk of injury, as well as the inconvenience, involved in mounting an automobile wheel on a hub assembly, as well as in a lifting a wheel into the body of an automobile.

In accordance with an aspect of the present invention, a method for lifting an automobile wheel into a body of an automobile comprises the steps of: providing an elongated member having first and second longitudinal extremities, and a pivot means for pivotally engaging the body of the automobile; releasably engaging the elongated member with the automobile wheel; engaging the pivot means with the body of the automobile; and lifting the elongated member while pivotally supporting the first extremity of the elongated member with the pivot means on the body of the automobile such that the automobile wheel releaseably engaged with the elongated member is lifted into the body of the automobile.

In accordance with another aspect of the present invention, a device for use in lifting an automobile wheel into a body of an automobile comprises: an elongated member having first and second longitudinal extremities; releasable engaging means for releasably engaging the elongated member with the automobile wheel for lifting the automobile wheel with the elongated member; and pivot means for pivotally engaging the body of the automobile to support the first longitudinal extremity of the elongated member on the body of the automobile upon lifting said elongated member to lift the automobile wheel into the body.

In accordance with a further aspect of the present invention, a method for mounting an automobile wheel on an automobile wheel hub assembly is provided. The automobile wheel has an inner edge defining a central aperture adapted to fit over an outer surface of an axially central member of the wheel hub assembly and a plurality of stud apertures positioned to fit over a plurality of retaining studs of the automobile wheel hub assembly. The method comprises the steps of: providing an elongated member having first and second longitudinal extremities and a pivot member positioned at the first longitudinal extremity of the elongated member and having a contact surface; placing the elongated member within the central aperture of the automobile wheel; placing the contact surface of the pivot member on the outer surface of the axially central member such that the contact surface conforms to the outer surface of the axially central member; lifting the elongated member while the same is within the central aperture and while the contact surface of the pivot member is in contact with the outer surface of the axially central member such that the pivot member pivots on the outer surface of the axially central member while conforming thereto and the first longitudinal extremity of the elongated member is supported by the pivot member on the axially central member; and moving the automobile wheel along the elongated member and over the axially central member into engagement with the automobile wheel hub assembly.

In accordance with still another aspect of the present invention, a device for mounting an automobile wheel on an automobile wheel hub assembly is provided. The automobile wheel has an inner edge defining a central aperture adapted to fit over an outer surface of an axially central member of the wheel hub assembly and a plurality of stud apertures positioned to fit over a plurality of retaining studs of the automobile wheel hub assembly. The device comprises: an elongated member having first and second longitudinal extremities and an outer lateral surface shaped to permit the inner edge of the automobile wheel to slide longitudinally on the elongated member, and a pivot member positioned at the first longitudinal extremity of the elongated member, the pivot member having a contact surface configured to conform to the outer surface of the axially central member when in contact therewith and to pivot on the outer surface of the axially central member with rotation of the elongated member with respect to the axially central member to support the first longitudinal extremity of the elongated member on the axially central member upon lifting the elongated member to mount the automobile wheel to the automobile wheel hub assembly.

In accordance with another aspect of the present invention, a device for contacting the outer surface of an axially central member of an automobile wheel hub assembly for pivoting thereon in combination with an elongated member for mounting an automobile wheel on the automobile wheel hub assembly is provided. The device comprises: a body having first and second opposed surfaces; the first surface being shaped to conform to the outer surface of the axially central member; and affixing means for releasably affixing the second surface of the body to a longitudinal extremity of the elongated member.

In accordance with a still further aspect of the present invention, a method for mounting an automobile wheel on an automobile wheel hub assembly is provided. The automobile wheel has an inner edge defining a central aperture adapted to fit over an axially central member of the wheel hub assembly having an inner wall facing generally toward an axis of the wheel hub assembly, the automobile wheel having a plurality of stud apertures positioned to fit over a plurality of retaining studs of the automobile wheel hub assembly. The method comprises the steps of: providing an elongated member having first and second longitudinal extremities and a pivot member positioned at the first longitudinal extremity of the elongated member and having a contact surface; placing the elongated member within the central aperture of the automobile wheel; placing the contact surface of the pivot member on the inner wall of the axially central member; lifting the elongated member while the same is within the central aperture of the automobile wheel and while the contact surface of the pivot member is in contact with the inner wall of the axially central member such that the pivot member pivots on the inner wall of the axially central member and the first longitudinal extremity of the elongated member is supported by the pivot member on the inner wall; and moving the automobile wheel along the elongated member and over the axially central member into engagement with the automobile wheel hub assembly.

In accordance with yet still another aspect of the present invention, a device for mounting an automobile wheel on an automobile wheel hub assembly is provided. The automobile wheel has an inner edge defining a central aperture adapted to fit over an axially central member of the wheel hub assembly having an inner wall facing generally toward an axis of the wheel hub assembly, the automobile wheel having a plurality of stud apertures positioned to fit over a plurality of retaining studs of the automobile wheel hub assembly. The device comprises: an elongated member having first and second longitudinal extremities and an outer lateral surface shaped to permit the inner edge of the automobile wheel to slide longitudinally on the elongated member; and a pivot member positioned at the first longitudinal extremity of the elongated member, the pivot member having a contact surface positioned to contact the inner wall of the axially central member and to pivot on the inner wall with rotation of the elongated member with respect to the axially central member to support the first longitudinal extremity of the elongated member on the inner wall upon lifting the elongated member to mount the automobile wheel on the automobile wheel hub assembly.

In accordance with a yet still further aspect of the present invention, a grease cap for an automobile wheel hub assembly comprises: a body having a lateral outer wall extending about an axis of the grease cap and extending axially to first and second extremities thereof, and an end wall affixed to and closing the first extremity of the lateral outer wall; and means for removably affixing the body of the grease cap to an axially central member of the automobile wheel hub assembly; the lateral outer wall of the body having a radially outwardly extending projection.

In accordance with another aspect of the present invention, a method for mounting an automobile wheel on an automobile wheel hub assembly comprises the steps of: providing an elongated member having first and second longitudinal extremities, the elongated member including a main body extending from the first longitudinal extremity toward the second longitudinal extremity and a handle member received within the main body; providing a pivot member positioned at the first longitudinal extremity of the elongated member; releasably engaging the elongated member with the automobile wheel for lifting the automobile wheel with the elongated member; placing the pivot member on the automobile wheel hub assembly; extending the handle member from the main body such that the second longitudinal extremity of the elongated member is extended in a direction away from the first longitudinal extremity thereof; lifting the elongated member and the automobile wheel engaged therewith by applying force to the handle member while the pivot member is in contact with the automobile wheel hub assembly such that the pivot member pivots on the automobile wheel hub assembly and the first longitudinal extremity of the elongated member is supported by the pivot member thereon; and moving the automobile wheel releaseably engaged with the elongated member into engagement with the automobile wheel hub assembly.

In accordance with a further aspect of the present invention, a device for mounting an automobile wheel on an automobile wheel hub assembly comprises: an elongated member having first and second longitudinal extremities, the elongated member including a main body extending from the first longitudinal extremity toward the second longitudinal extremity, and a handle member received within the main body and extendable outwardly therefrom to define the second longitudinal extremity of the elongated member; releasable engaging means for releasably engaging the elongated member with the automobile wheel for lifting the automobile wheel with the elongated member; and pivot means for pivotally engaging the automobile wheel hub assembly to support the first longitudinal extremity of the elongated member on the automobile wheel hub assembly upon lifting the elongated member to mount the automobile wheel on the automobile wheel hub assembly.

The above, and other objects, features and advantages of the invention, will be apparent in the following detailed description of certain illustrative embodiments thereof which is to be read in connection with the accompanying drawings forging a part hereof, and wherein corresponding parts and components are identified by the same reference numerals in the several views of the drawings.

DETAILED DESCRIPTION OF CERTAIN ADVANTAGEOUS EMBODIMENTS

Figure 1:
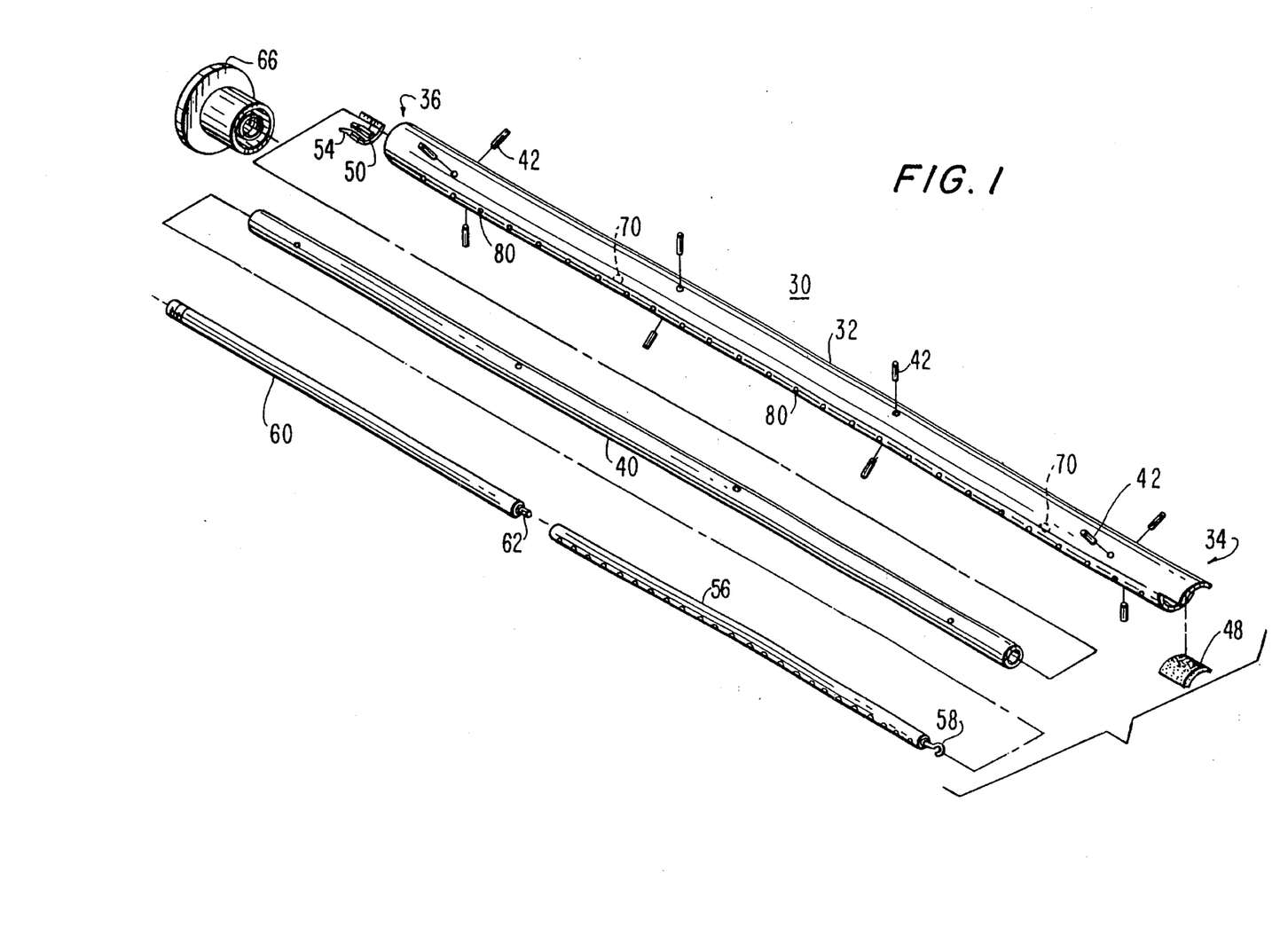
FIG. 1 is an exploded view of a device for lifting an automobile wheel into a body of an automobile and mounting an automobile wheel on an automobile wheel hub assembly.
Figure 2:
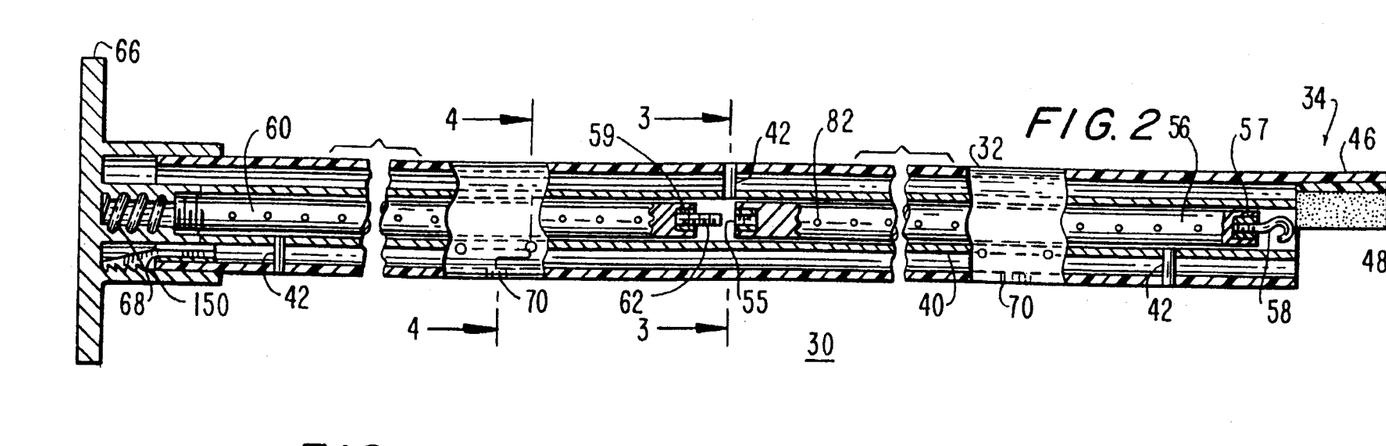
FIG. 2 is a partially cross-sectional view along a longitudinal axis of the device of FIG. 1 as assembled.

With reference now to the drawings and initially to FIGS. 1 and 2 thereof, a first embodiment of a device for mounting an automobile wheel on an automobile wheel hub assembly, and for lifting an automobile wheel into an automobile body is illustrated therein. As used in this application, the term "automobile" includes passenger vehicles such as vans, pickup trucks, sedans, station wagons and other types of automobiles.

Figure 3:
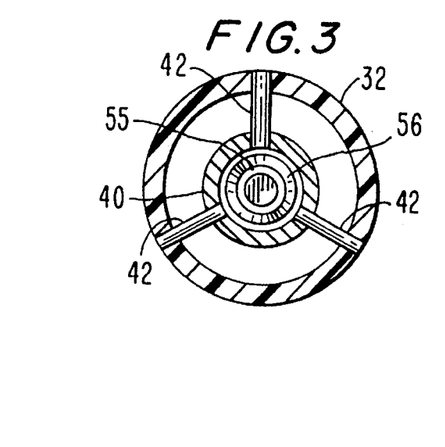
FIG. 3 is a cross-sectional view taken along the lines 3—3 in FIG. 2.

The device 30 includes a generally cylindrical main barrel 32 having a smooth cylindrical outer surface and extending from a first longitudinal extremity 34 to a second longitudinal extremity 36. The main barrel 32 has an inner wall defining a central aperture thereof in which a hollow tubular carrier member 40 is retained in position by a plurality of internal braces 42 so that a central axis of the tubular carrier member 40 is aligned with a central axis of the main barrel 32. As shown in FIG. 1, the braces 42 are introduced through apertures in the main barrel 32, and with reference to FIGS. 2 and 3, the braces 42 are received in corresponding apertures of the tubular carrier member 40. The main barrel 32 and the tubular carrier member 40 may be made, for example, from PVC pipe sections machined to form the main barrel 32 and tubular carrier member 40. The braces 42 may be fastened to the main barrel 32 and the tubular carrier member 40 by epoxy adhesive. As an alternative, the braces 42 may be pressure fitted to the barrel 32 and member 40. It will be appreciated that other materials may be employed to fashion the main barrel 32 and tubular carrier member 40 as well as the braces 42. For example, these elements may be fabricated from other plastic materials as well as from metal.

The first longitudinal extremity 34 of the main barrel 32 is partially cut away circumferentially to form a projection 46 extending through an arc of, for example, less than 180 degrees to permit the first longitudinal extremity 34 to be positioned over an axially central member of an automobile wheel hub assembly with ease. A removable pad 48 includes a body having an outer circumferential surface configured to fit closely against the inner wall of the main barrel 32 at the projection 46. The removable pad 48 is releasably affixed to the inner wall of the projection 46, for example, by means of snap fasteners or by a hook and loop fastener such as those sold under the trademark Velcro or by an appropriate adhesive that does not form a permanent bond. The devices for removeably affixing the pad 48 to the projection 46 are not shown for purposes of simplicity and clarity.

The body of the pad 48 has an inner surface opposite its outer circumferential surface on which a plurality of minute abrasive particles are affixed to assist in providing a stable coupling between the pad 48 and an axially central member of the automobile wheel hub assembly by resisting axial movement between the inner surface of pad 48 and the outer surface of the axially central member, as well as rotation of the pad 48 about the axis of the axially central member. In the alternative, the inner surface of the pad 48 may be machined or otherwise formed with a texture which inhibits slippage of the pad 48 off the axially central member. As an example, an abrasive sheet such as those sold under the trademark Dragon Skin may form the inner surface of the pad 48.

The second longitudinal extremity 36 of the main barrel 32 is affixed to an arcuate holder 50 to which three projections 52 are affixed. The projections 52 are provided with teeth 150 on radially outwardly facing surfaces thereof to assist in providing a secure coupling of the second longitudinal extremity 36 to an inwardly facing surface of an automobile wheel hub assembly, as described in greater detail hereinbelow.

The device 30 also includes a first dowel 56 slidably received in the hollow tubular carrier member 40 and which, when retracted therein, extends approximately from a longitudinal center thereof outwardly towards the first longitudinal extremity 34 of the main barrel 32. A first extremity of the dowel 56 adjacent the longitudinal center of member 40 as shown in FIG. 2 is fitted with an internally threaded coupling 55, while a second end of the dowel 56 adjacent the first longitudinal extremity 34 of the main barrel 32 is provided with another internally threaded coupling 57 having a hook fastener 58 removably engaged therewith. Since the fastener 58 is removably engaged with the coupling 57, it may also be used to receive other threaded devices such as a straight screw fastener or an angled or curved fastener for affixing the dowel 56 to a support or for engaging the body of an automobile. A second dowel 60 is slidably received within the tubular carrier member 40 and extends from a first end thereof having a further internally threaded fastener 59 positioned approximately at the longitudinal center of the carrier member 40 when retracted fully therein, to a second, externally threaded end thereof. The fastener 59 is mated with a screw fastener 62 projecting outwardly therefrom. Dowels 56 and 60 may be made, for example, of wood.

A base member 66 is slidably received over the second longitudinal extremity 36 of the main barrel 32 to enclose the projections 52 therein and also serves as a base to support the second dowel 60 in an upright position when it is removed from within the tubular carrier member 40 and the threaded end of the dowel 60 is engaged with a threaded portion 68 of the base member 66. In this manner, the base member 66 and dowel 60 supported thereby together serve as a means for supporting the device 30 as an automobile wheel is slid from the device 30 onto a wheel hub or when the automobile wheel is removed therefrom. Dowel 60 serves separately as a handle for providing mechanical advantage in lifting the device 30, as explained in greater detail below. In order to affix the dowel 60 to the main barrel 32 of the device 30, a plurality of threaded nuts 70 are embedded in the main barrel 32, as shown in FIGS. 1, 2 and 4 to receive the screw fastener 62 affixed to the dowel 60 to firmly secure the dowel 60 to the main barrel 32.

Figure 4:
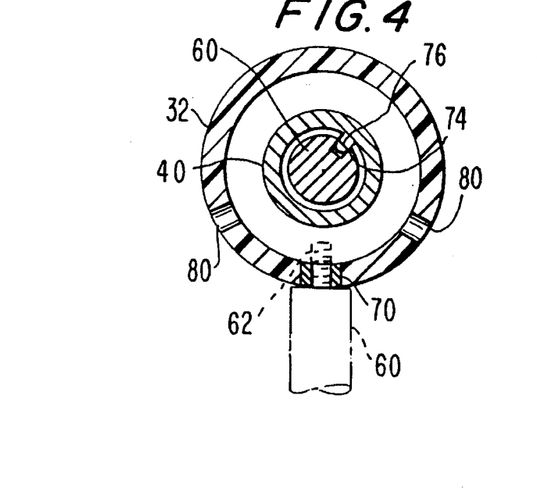
FIG. 4 is a cross-sectional view taken along the lines 4—4 in FIG. 2.

With reference to FIG. 4, each of the dowels 56 and 60 is provided with a slot 74 extending longitudinally in its outer surface and slidably receiving a key 76 extending inwardly from an inner wall of the tubular carrier member 40. The engagement of the key 76 with the slot 74 serves to prevent rotation of the respective dowel 56 or 60 with respect to the carrier member 40 as well as the main barrel 32. The dowels 56 and 60 may be extended outwardly therefrom in an axial direction to extend the device 30 beyond either the first or second longitudinal extremity of main barrel 32 to provide a user with greater leverage or mechanical advantage when lifting a wheel with the use of the device 30. The amount of leverage or mechanical advantage as may be required by the user for comfortably lifting a wheel may be adjusted by selecting the amount by which one of the dowels 56 and 60 is extended from the main barrel 32. It will be seen also that the dowels 56 and 60 may be releasably joined by engaging fastener 62 with coupling 55 to provide still greater leverage, if desired.

The outer surface of the main barrel 32 is provided with a plurality of apertures 80 spaced in pairs longitudinally therealong for a purpose discussed hereinbelow. In addition, each of the dowels 56 and 60 is provided with a plurality of openings 82 extending thereinto and spaced longitudinally therealong. Openings 82 are also described in greater detail hereinbelow.

In a modification to the device of FIGS. 1–4, the main barrel 32 is provided with a thread at its first longitudinal extremity and the projection 46 is provided on a device which may be coupled to the thread at the first longitudinal extremity of the barrel 32. In this manner the device including the projection 46 may be removed from the barrel 32 and a second device on which the arcuate holder 50 and projections 52 are mounted may instead be coupled to the main barrel 32. Moreover, a differently sized and/or shaped projection may be substituted for projection 46 to fit a particular grease cap or other axially central member of a hub.

Figures 5, 6, 7:
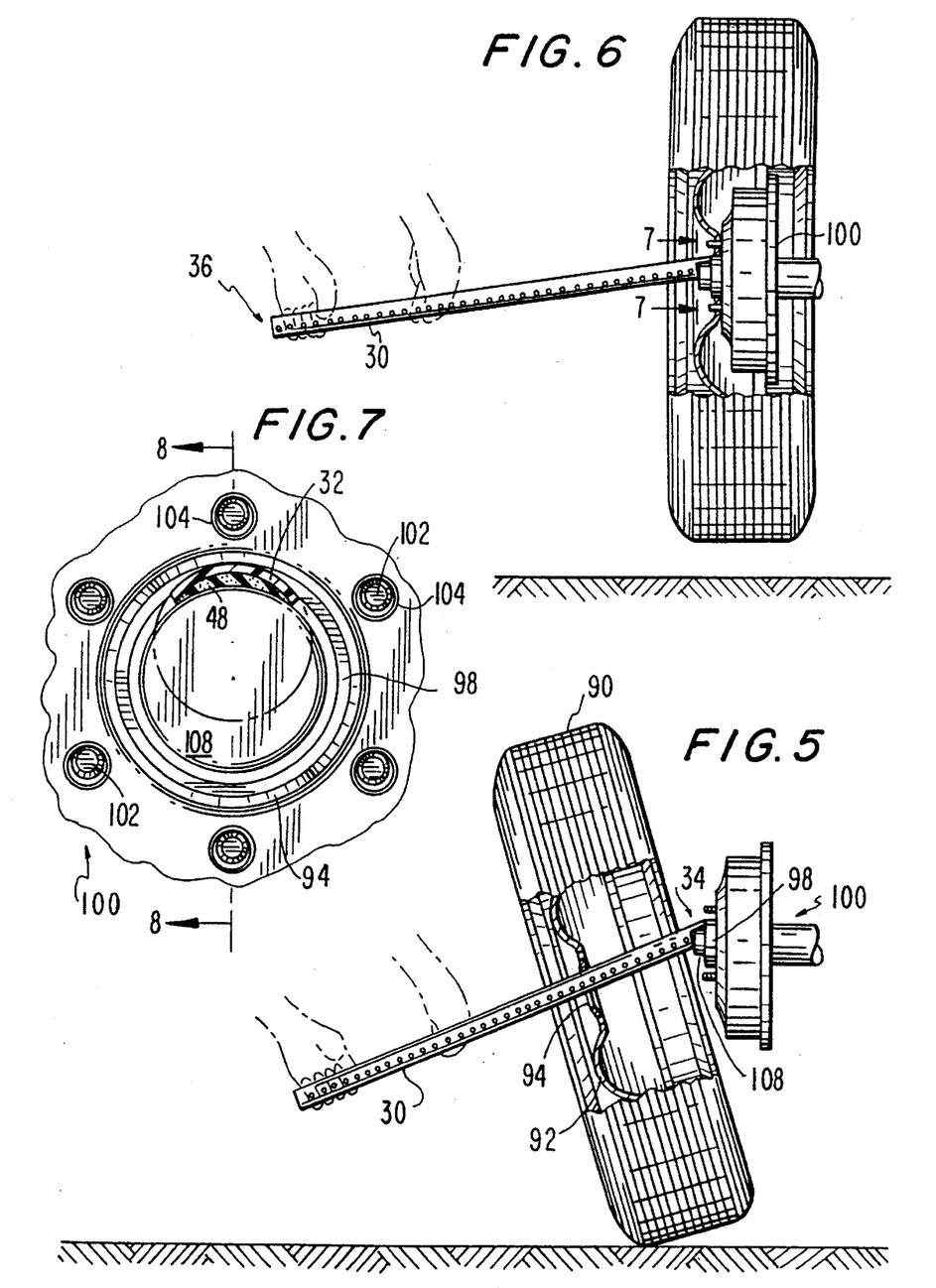
FIG. 5 illustrates a method for mounting an automobile wheel on an automobile wheel hub assembly using the device of FIGS. 1–4.
FIG. 6 illustrates the method of FIG. 5 at a point where the automobile wheel has been mounted onto the hub assembly with the use of the device of FIGS. 1–4.
FIG. 7 is a cross-sectional view taken along the line 7—7 in FIG. 6.

A method for mounting an automobile wheel to an automobile wheel hub assembly with the use of the device illustrated in FIGS. 1–4 will now be described with reference to FIGS. 5 through 8. With reference first to FIG. 5, an automobile wheel 90 is illustrated therein partially in cross section and is seen to include a wheel rim 92 having an inner circular edge 94 defining a central aperture dimensioned to fit over an outer surface of an axially central shaft 98 of an automobile wheel hub assembly 100. The wheel hub assembly 100 also includes a plurality of retaining studs 102 spaced circumferentially about the shaft 98 and positioned radially outwardly therefrom to fit within corresponding apertures 104 of the wheel rim 92. Each of the retaining studs 102 is threaded to receive a nut for retaining the wheel rim 92 to the wheel hub assembly 100. The wheel hub assembly 100 also includes a grease cap 108 (also referred to as a dust cap in some cases) which serves to enclose and protect certain elements of the wheel hub assembly 100 against damaging materials such as dust and dirt. It will be appreciated that the components of a wheel hub assembly will vary from model to model and depending on whether a given wheel hub assembly is a front or rear assembly. For example, while a front hub assembly of a given automobile may have a grease cap as an axially central member thereof, a rear hub assembly of the same automobile may have a spindle or axle as an axially central member. Some wheel hub assemblies, moreover, include a fastener as an axially central member.

Figure 8:
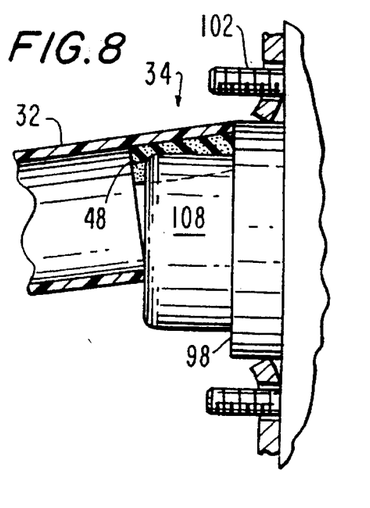
FIG. 8 is a cross-sectional view taken along the lines 8—8 in FIG. 7.

With reference in particular to FIGS. 5, 7 and 8, in order to mount the wheel 90 to the wheel hub assembly 100, the device 30 is placed within the central aperture 94 of the automobile wheel 90 and the inner surface of the pad 48 at the first longitudinal extremity 34 of the device 30 is placed on an upwardly facing portion of a lateral outer surface of the grease cap 108, shown best in FIGS. 7 and 8. As seen therein, the inner surface of the pad 48 is shaped to conform to the lateral outer surface of the grease cap 108 which assists in providing a secure coupling between the first longitudinal extremity 34 of the device 30 and the outer surface of the grease cap 108. As mentioned above, the pad 48 is removable from the main barrel 32 to permit differently shaped pads 48 to be substituted to permit a user to select a pad having an inner surface conforming to the outer surface of a given grease cap 108 or other axially central member.

With reference in particular to FIG. 6, the user lifts the device 30 preferably adjacent the second longitudinal extremity 36 thereof as the first longitudinal extremity 34 pivots on the pad 48 resting on the outer surface of the grease cap 108 while conforming thereto and supported thereby, thus to lift the automobile wheel 90 with mechanical advantage to a position from which it may be slid along the cylindrical outer surface of the main barrel 32 of the device 30 into engagement with the shaft 98 and retaining studs 102 of the wheel hub assembly 100. In order to minimize the effort necessary to slide the central aperture 94 of the wheel rim 92 onto the shaft 98, the thickness of the main barrel 32 and pad 48 are each selected so that when the device 30 is raised to a horizontal position aligned with the axis of the wheel hub assembly 100 as the pad 48 rests on the outer surface of the grease cap 108, an upper extremity of the outer surface of the main barrel 32 is substantially aligned with an upper extremity of the shaft 98. It will be seen that, by virtue of this feature, the user may simply rotate the automobile wheel 90 on the outer surface of the device 30 until the stud apertures 104 are aligned with the retaining studs 102 and slide the wheel 90 onto the studs 102. It is, thus, unnecessary to lift the wheel in order to align all of the stud apertures 104 with the studs 102, as is the case when the wheel is supported through a stud aperture 104 and the stud 102 is not positioned at the uppermost point of its rotational path about the central axis of the wheel hub assembly 100. It will be appreciated, therefore, that the device and method in accordance with this embodiment of the invention provide the ability to mount a wheel to a wheel hub assembly with relative ease and safety. It will also be appreciated that the device 30 may be employed in removing a wheel from a hub by sliding the wheel onto the device as it rests, for example, on a grease cap. Then the device 30 is lowered to bring the wheel gently to the ground.

Figure 9:
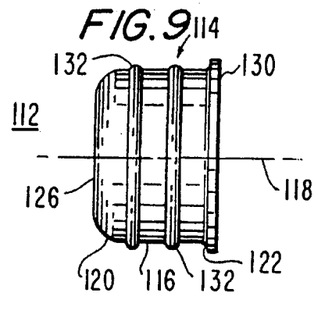
FIG. 9 is a side elevational view of a grease cap in accordance with a further embodiment of the present invention.

With reference now to FIG. 9, a grease cap 112 for an automobile wheel hub assembly in accordance with another embodiment of the present invention includes a body 114 having a generally cylindrical lateral outer wall 116 arranged circumferentially about an axis 118 of the grease cap 112. The lateral outer wall extends from a first extremity thereof shown generally at 120 to a second extremity 122 thereof. An end wall 126 extends from and closes the first extremity 120 of the lateral outer wall 116. A lip 130 is arranged at the second extremity 122 of the lateral outer wall 116 and serves to form a frictional fit of the grease cap to an axially central member of an automobile wheel hub assembly, not shown for purposes of simplicity and clarity.

A plurality of radially outwardly extending ribs 132 are formed on the lateral outer wall 116 of the grease cap 112 and extend circumferentially about the lateral outer wall 116. The ribs 132 assist in providing a secure coupling of the pad 48 to the grease cap 112 by resisting motion of the pad 48 along the lateral outer wall 116 in a direction parallel to the axis 118 as pressure is applied between the pad 48 and the lateral outer wall 116 when the device 30 is lifted in order to lift the wheel 90, for example, as illustrated in FIG. 5. The cap 112 may be substituted for an existing grease cap that affords little or no purchase for the pad 48.

Figure 10:
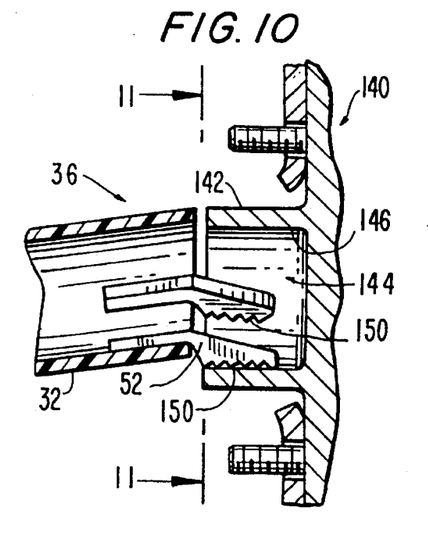
FIG. 10 is a cross-sectional view of the device of FIGS. 1–4 supported at a longitudinal extremity thereof on an interior surface of an automobile wheel hub assembly for pivoting thereon to lift an automobile wheel to the hub assembly.
Figure 11:
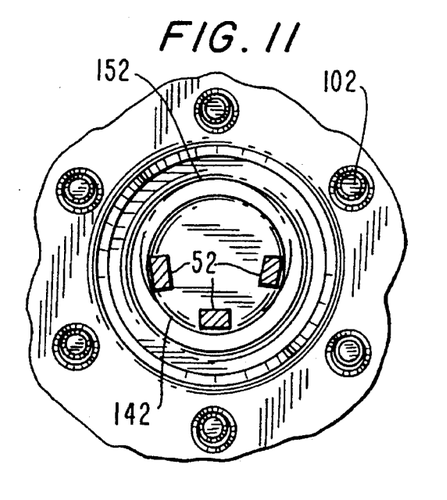
FIG. 11 is a cross-sectional view taken along the lines 11—11 in FIG. 10.

With reference now to FIGS. 10 and 11, a further method for mounting an automobile wheel to an automobile wheel hub assembly with the use of the device of FIGS. 1–4 is illustrated in connection therewith. As shown in FIGS. 10 and 11, a further automobile wheel hub assembly 140 includes a modified shaft 142 having a well 144 defined laterally by an inner wall 146 facing generally towards an axis of the wheel hub assembly 140. The method illustrated in FIGS. 10 and 11 includes the same steps described above in connection with FIGS. 5 through 8 of the first method, except that in practicing the method of FIGS. 10 and 11 the three projections 52 at the second longitudinal extremity 36 of the device 30 are positioned within the well 144 to engage the inner wall 146 with the teeth 150 on their outwardly facing surfaces. The device 30 is lifted as the teeth remain in contact with the inner wall 146 so that the device 30 pivots on inner wall 146 by means of the projections 52, and the second extremity 36 is supported by the inner wall 146. The dimensions of the projections 52 as well as the diameter of the main barrel 32 of the device 30 are selected so that when the device 30 is brought to a horizontal position aligned with the axis of the wheel hub assembly 140 as the teeth 150 of the projections 52 rest on the inner wall 146 of the modified shaft 142, an upper extremity of the outer surface of the main barrel 32 is substantially aligned with an upper extremity of an outer surface of the modified shaft 142, thus to permit the automobile wheel to slide easily over the outer surface of the device 30 onto the modified shaft 142. This alignment is illustrated in particular at point 152 in FIG. 11.

Figures 12, 13, 14, 15, 16:
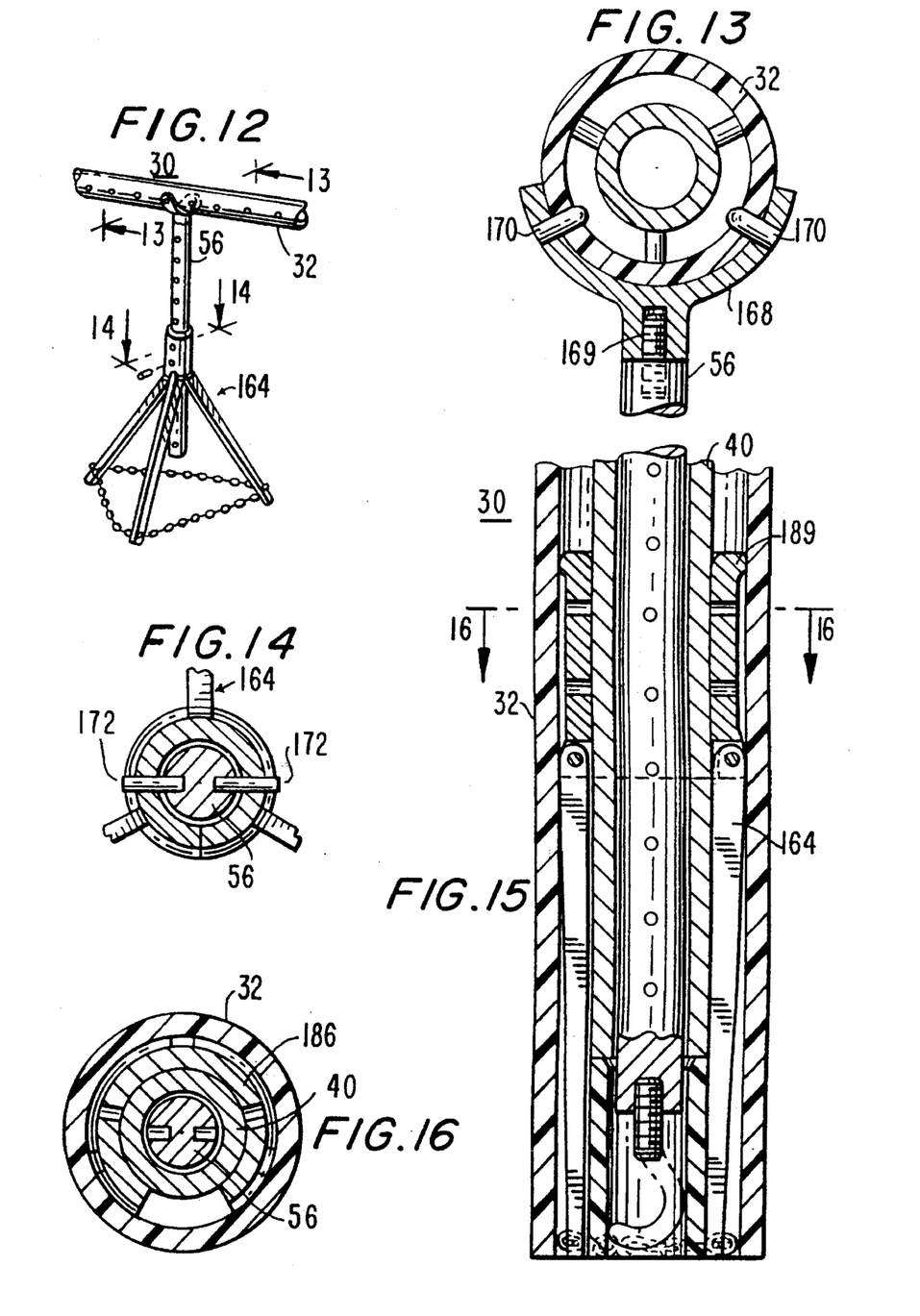
FIG. 12 is a perspective view of a support assembly for supporting the device of FIGS. 1–4 as an automobile wheel is slid thereover onto an automobile wheel hub assembly.
FIG. 13 is a cross-sectional view taken along the lines 13—13 of FIG. 12.
FIG. 14 is a cross-sectional view taken along the lines 14—14 in FIG. 12.
FIG. 15 is a partially cross-sectional view of a further embodiment of a device for lifting and/or removing an automobile wheel to and from an automobile wheel hub assembly and an automobile body in which the device of FIG. 12 is stored.
FIG. 16 is a cross-sectional view taken along the lines 16—16 in FIG. 15.

With reference now to FIGS. 12, 13 and 14, a further embodiment of the present invention is illustrated therein in which dowel 56 in combination with a tripod stand 164 serves to support the main barrel 32 of the device 30. As seen especially in FIG. 13, the dowel 56 includes a saddle 168 affixed thereto by a screw fastener 169 having a pair of projections 170 for engaging the apertures 80 on the main barrel 32. The dowel 56 and tripod 164 serve to support the device 30 while the first or second extremity of the main barrel 32 rests on a grease cap or other portion of a wheel hub assembly as an automobile wheel is slid over the device 30 onto the wheel hub assembly. As seen especially in FIG. 14, a pair of pins 172 lock the dowel 56 in place vertically with respect to the tripod 164.

FIGS. 15 and 16 illustrate how the tripod stand 164 may be stored in device 30. The tripod 164 is carried within the main barrel 32 when not in use, as shown in FIGS. 15 and 16 between the main barrel 32 and the hollow tubular carrier member 40. In order to permit the tripod 164 to slide between the main barrel 32 and the hollow tubular carrier member 30, a sleeve 186 of the tripod 164 is split longitudinally so that the sleeve may be expanded to fit within the space defined by the carrier 40 and the main barrel 32, as best seen in FIG. 16. In a further embodiment, the sleeve 186 is provided with an internal thread and the dowel 56 is replaced by a machine screw having a corresponding external thread.

Figures 17, 18:
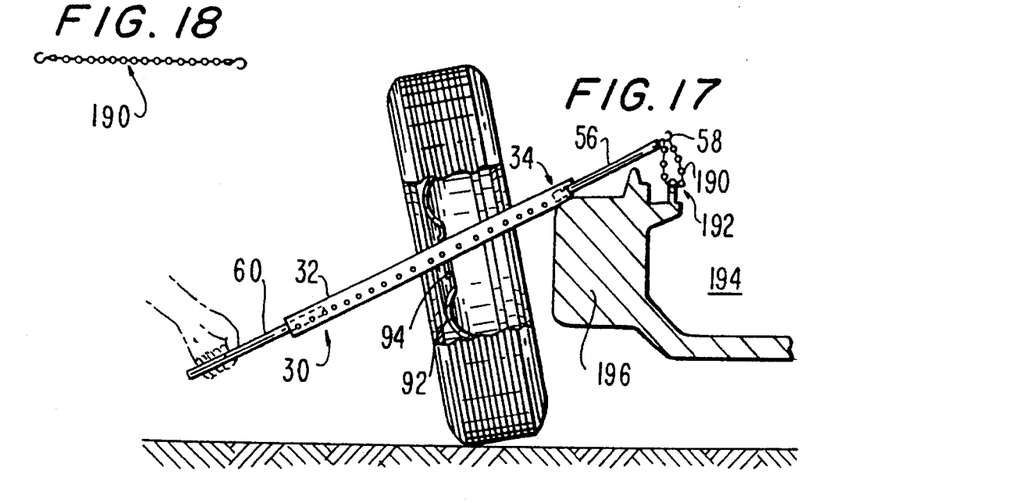
FIG. 17 illustrates a method using the device of FIGS. 1–4 for lifting an automobile wheel into the trunk of an automobile.
FIG. 18 illustrates a safety chain for use in carrying out the method of FIG. 17.

A first embodiment of a method for lifting an automobile wheel into a body of an automobile using the device of FIGS. 1 through 4 will now be explained in connection with FIGS. 17 and 18. As shown in FIG. 17, the main barrel 32 of the device 30 is slid through the central aperture 94 of the automobile wheel rim 92 and the dowel 56 is slid outwardly of the main barrel 32 to a point at which a safety chain 190 (illustrated in greater detail in FIG. 18) may be placed around the hook 58 of the dowel 56 and through an opening 192 in the body of an automobile adjacent a trunk 194 thereof. The first longitudinal extremity 34 of the main barrel 32 rests on an upper surface of a rear wall 196 of the body of the automobile to provide a pivot means for pivoting the device 30 thereon while the safety chain 190 assists in securing the device 30 against slippage off the upper surface of the rear wall 196.

Then the dowel 60 is extended longitudinally from the main barrel 32 to provide further mechanical advantage and a user grasps the dowel 60 and applies an upward force thereon in order to lift the device 30 with the automobile wheel to a point at which the wheel may be slid off the device 30 and into the trunk 194.

In a modification of the above-described method for lifting an automobile wheel into the body of an automobile using the device 30, the hook 58 engages the body of the automobile and acts as the above-described pivot means.

Figures 19, 20:
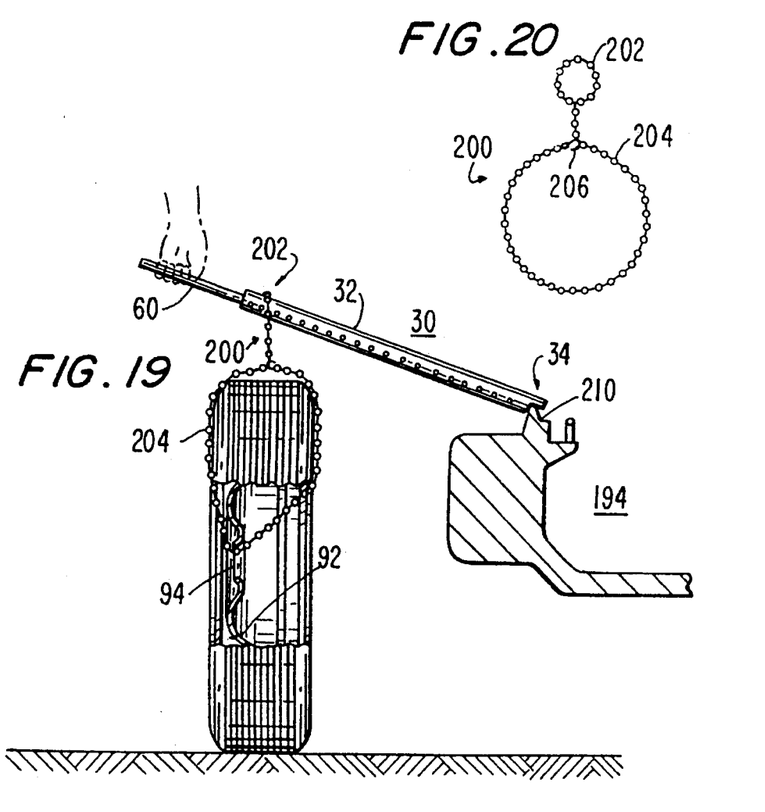
FIG. 19 is a partially cross sectional view illustrating a further method for lifting an automobile wheel into the trunk of an automobile using the device of FIGS. 1–4.
FIG. 20 illustrates a chain device which is useful in carrying out the method of FIG. 19.

A further embodiment of a method for lifting an automobile wheel into a body of an automobile using the device 30 is now explained in connection with FIGS. 19 and 20. As shown in FIG. 19, a chain 200 has a first, relatively smaller loop 202 permanently formed thereby which is slid over the main barrel 32 of the device 30. A relatively larger loop 204 is temporarily formed by passing an end of the chain 200 to which a hook 206 is affixed opposite the relatively smaller loop 202 through the central aperture 94 of the wheel rim 92. Then the hook 206 is engaged with a portion of the chain 200 above the automobile wheel to releasably engage the device 30 with the automobile wheel.

The first longitudinal extremity 34 engages an upper surface of the automobile body, indicated at 210, adjacent the trunk 194 to provide a means for pivoting the device 30 thereon. A user affixes dowel 60 to dowel 56 using the fastener 62, as described above. Then the user arranges the coupled dowel 60 and 56 to extend from the main barrel 32 to provide mechanical advantage in lifting the device 30. The coupled dowels 56 and 60 thus provide still further leverage when lifting the device 30. The user grasps the dowel 60 and applies an upward force to lift the device 30 as the longitudinal extremity 34 pivots on the upper surface 210 such that the automobile wheel releaseably engaged with the device 30 by means of the chain 200 is lifted to a point at which it may be swung into the trunk 194.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A device for use in lifting an automobile wheel into a body of an automobile, comprising:

an elongated member having first and second longitudinal extremities, the elongated member comprising a main body extending from the first longitudinal extremity toward the second longitudinal extremity, and a handle member slidably received within the main body and extendable outwardly therefrom to define the second longitudinal extremity of said elongated member;

releasable engaging means for releasably engaging the elongated member with the automobile wheel for lifting the automobile wheel with the elongated member; and pivot means for pivotally engaging the body of the automobile to support the first longitudinal extremity of the elongated member on the body of the automobile upon lifting said elongated member to lift the automobile wheel into the body.

2. The device of claim 1, wherein the releasable engaging means comprises means for releasably affixing to the automobile wheel and engaging the elongated member for support thereby.

3. The device of claim 2, wherein the means for releasably affixing to the automobile wheel is operative to slidably engage an outer surface of the elongated member.

4. The device of claim 1, wherein the releasable engaging means comprises an outer surface of said elongated member shaped to permit an inner edge of the automobile wheel defining an aperture therethrough to be slid longitudinally thereon.

5. The device of claim 1, wherein the pivot means comprises a body contacting member rigidly affixed to the elongated member and having a contact surface positioned to contact a portion of the automobile body and press thereagainst to support the elongated member pivotally against the body portion when the elongated member is lifted.

6. The device of claim 5, further comprising securing means for securing the pivot means in pivotal engagement with the body of the automobile.

7. The device of claim 6, wherein the securing means comprises means for affixing to the device and to the body of the automobile to resist separation of the pivot means from pivotal engagement with the automobile body.

8. The device of claim 1, wherein the releasable engaging means comprises a flexible member fitting over the outer surface of said elongated member and through an aperture in the automobile wheel to engage the flexible member therewith.

9. A device for use in lifting an automobile wheel into a body of an automobile, comprising:

an elongated member having first and second longitudinal extremities;

releasable engaging means for releasably engaging the elongated member with the automobile wheel for lifting the automobile wheel with the elongated member, the releasable engaging means comprising a flexible member having a first loop fitting over the outer surface of said elongated member to thereby support the flexible member so that the flexible member is slidably engaged with the outer surface of the elongated member, the releasable engaging means further comprising a portion affixed to the first loop and having means for releasably affixed an end thereof to said portion to form a second loop fitting through an aperture in the automobile wheel to releasably engage the flexible member therewith; and pivot means for pivotally engaging the body of the automobile to support the first longitudinal extremity of the elongated member on the body of the automobile upon lifting said elongated member to lift the automobile wheel into the body.

10. The device of claim 9, wherein the flexible member comprises a chain.

11. A device for mounting an automobile wheel on an automobile wheel hub assembly, the automobile wheel having an inner edge defining a central aperture adapted to fit over an outer surface of an axially central member of the wheel hub assembly and a plurality of stud apertures positioned to fit over a plurality of retaining studs of the automobile wheel hub assembly, comprising:

an elongated member having first and second longitudinal extremities and an outer lateral surface shaped to permit the inner edge of the automobile wheel to slide longitudinally on the elongated member; and a pivot member positioned at the first longitudinal extremity of the elongated member, the pivot member having a contact surface configured to conform to the outer surface of the axially central member when in contact therewith and to pivot on said outer surface of the axially central member with rotation of the elongated member with respect to the axially central member to support the first longitudinal extremity of the elongated member on the axially central member upon lifting said elongated member to mount the automobile wheel on the automobile wheel hub, the contact surface of the pivot member being positioned with respect to an upper extremity of the elongated member at the first longitudinal extremity thereof such that when the elongated member is rotated to a position substantially aligned with respect to an axis of the wheel hub assembly with the contact surface of the pivot member in contact with the outer surface of the axially central member, the upper extremity of the elongated member is substantially aligned with an upper extremity of a shaft of the wheel hub assembly provided for mounting the inner edge of the automobile wheel.

12. The device of claim 11, wherein the outer lateral surface of the elongated member has a substantially cylindrical configuration such that the inner edge of the automobile wheel may be rotated on the outer lateral surface of the elongated member for aligning the stud apertures of the automobile wheel with the plurality of retaining studs of the automobile wheel hub.

13. The device of claim 11, wherein the pivot member includes means for resisting translational motion between the contact surface of the pivot member and the outer surface of the axially central member.

14. The device of claim 11, wherein the pivot member is operative to releasably affix to the first longitudinal extremity of the elongated member.

15. The device of claim 14, wherein the pivot member comprises a pad.

16. The device of claim 11, further comprising means for supporting the elongated member vertically at a position thereof spaced axially from the first longitudinal extremity thereof.

17. A device for mounting an automobile wheel on an automobile wheel hub assembly, the automobile wheel having an inner edge defining a central aperture adapted to fit over an outer surface of an axially central member of the wheel hub assembly and a plurality of stud apertures positioned to fit over a plurality of retaining studs of the automobile wheel hub assembly, comprising:

an elongated member having first and second longitudinal extremities and an outer lateral surface shaped to permit the inner edge of the automobile wheel to slide longitudinally on the elongated member; and a pivot member positioned at the first longitudinal extremity of the elongated member, the pivot member having a contact surface configured to conform to the outer surface of the axially central member when in contact therewith and to pivot on said outer surface of the axially central member with rotation of the elongated member with respect to the axially central member to support the first longitudinal extremity of the elongated member on the axially central member upon lifting said elongated member to mount the automobile wheel on the automobile wheel hub;

said device being combined with a grease cap including a body having a generally cylindrical lateral outer wall arranged circumferentially about an axis of the grease cap and extending axially to first and second extremities thereof, and an end wall extending from and closing the first extremity of the lateral outer wall; and means for removably affixing the body of the grease cap to an axially centered projection of the hub assembly;

the lateral outer wall of the body having a radially outwardly extending projection;

the contact surface of the pivot member of the device being configured to conform to the lateral outer wall of the grease cap as said axially central member and to pivot on said lateral outer wall to support the first longitudinal extremity of the elongated member thereon.

18. A device for mounting an automobile wheel on an automobile wheel hub assembly, the automobile wheel having an inner edge defining a central aperture adapted to fit over an outer surface of an axially central member of the wheel hub assembly and a plurality of stud apertures positioned to fit over a plurality of retaining studs of the automobile wheel hub assembly, comprising:

an elongated member having first and second longitudinal extremities and an outer lateral surface shaped to permit the inner edge of the automobile wheel to slide longitudinally on the elongated member, the elongated member comprising a main body extending from the first longitudinal extremity toward the second longitudinal extremity, and a handle member slidably received within the main body and extendable outwardly therefrom to define the second longitudinal extremity of said elongated member; and a pivot member releasably affixed at the first longitudinal extremity of the elongated member, comprising:

a body having first and second opposed surfaces;

the first surface being shaped to conform to said outer surface of said axially central member; and affixing means for releasably affixing the second surface of the body to the first longitudinal extremity of the elongated member.

19. The device of claim 18, wherein the body has a thickness selected such that when the first surface of the body is in contact with the outer surface of the axially central member, an upper edge of the first longitudinal extremity of the elongated member is substantially vertically aligned with an upper surface of a shaft of the wheel hub assembly provided for mounting a central aperture of the automobile wheel.

20. The device of claim 18, wherein the second surface of the body is configured to fit closely against a surface of the first longitudinal extremity of the elongated member.

21. The device of claim 18, wherein the affixing means comprises a snap fastener.

22. The device of claim 18, wherein the affixing means comprises a hook and loop fastener.

23. The device of claim 18, wherein the affixing means comprises an adhesive.

24. The device of claim 18, wherein the first surface of the body is provided with means for resisting motion of the first surface of the body from contact with the outer surface of the axially central member.

25. A device for mounting an automobile wheel on an automobile wheel hub assembly, the automobile wheel having an inner edge defining a central aperture adapted to fit over an axially central member of the wheel hub assembly having an inner wall facing generally toward an axis of the wheel hub assembly, the automobile wheel having a plurality of stud apertures positioned to fit over a plurality of retaining studs of the automobile wheel hub assembly, comprising:

an elongated member having first and second longitudinal extremities and an outer lateral surface shaped to permit the inner edge of the automobile wheel to slide longitudinally on the elongated member; and a pivot member positioned at the first longitudinal extremity of the elongated member, the pivot member having a contact surface positioned to contact the inner wall of the axially central member and to pivot on said inner wall with rotation of the elongated member with respect to the axially central member to support the first longitudinal extremity of the elongated member on said inner wall upon lifting said elongated member to mount the automobile wheel on the automobile wheel hub assembly; the contact surface of the pivot member being positioned with respect to an upper extremity of the elongated member at the first longitudinal extremity thereof such that when the elongated member is rotated to a position substantially aligned with respect to an axis of the wheel hub assembly with the contact surface of the pivot member in contact with the inner wall of the axially central member, the upper extremity of the elongated member is substantially aligned with an upper extremity of a shaft of the wheel hub assembly provided for mounting the inner edge of the automobile wheel.

26. The device of claim 25, wherein the contact surface of the pivot member is operative to resist translational motion between the contact surface of the pivot member and the inner wall of the axially central member.

27. The device of claim 26, wherein the contact surface of the pivot member is provided with a plurality of teeth.

28. The device of claim 25, further comprising means for supporting the elongated member vertically at a position thereof spaced axially from the first longitudinal extremity thereof.

29. A device for mounting an automobile wheel on an automobile wheel hub assembly comprising:

an elongated member having first and second longitudinal extremities, said elongated member including a main body extending from the first longitudinal extremity toward the second longitudinal extremity, and a handle member slidably received within the main body and extendable outwardly therefrom to define the second longitudinal extremity of said elongated member;

releasable engaging means for releasably engaging the elongated member with the automobile wheel for lifting the automobile wheel with the elongated member; and pivot means for pivotally engaging the automobile wheel hub assembly to support the first longitudinal extremity of the elongated member on the automobile wheel hub assembly upon lifting said elongated member to mount the automobile wheel on the automobile wheel hub assembly.

30. The device of claim 29, further comprising means for preventing rotation of the handle member with respect to the main body of the elongated member.

31. A device for mounting an automobile wheel on an automobile wheel hub assembly, the automobile wheel having an inner edge defining a central aperture adapted to fit over an outer surface of an axially central member of the wheel hub assembly and a plurality of stud apertures positioned to fit over a plurality of retaining studs of the automobile wheel hub assembly, comprising:

an elongated member having first and second longitudinal extremities and an outer lateral surface shaped to permit the inner edge of the automobile wheel to slide longitudinally on the elongated member; and a pivot member positioned at the first longitudinal extremity of the elongated member, the pivot member having a contact surface configured to conform to the outer surface of the axially central member when in contact therewith and to pivot on said outer surface of the axially central member with rotation of the elongated member with respect to the axially central member to support the first longitudinal extremity of the elongated member on the axially central member upon lifting said elongated member to mount the automobile wheel on the automobile wheel hub;

said device being combined with a wheel hub assembly member including a body having a lateral outer wall arranged about an axis thereof;

the lateral outer wall of the body having a radially outwardly extending projection;

the contact surface of the pivot member being configured to conform to the lateral outer wall of the wheel hub assembly member as said axially central member and to pivot on said lateral outer wall to support the first longitudinal extremity of the elongated member thereon.

* * * * *